(12) United States Patent
Heston et al.

(10) Patent No.: US 6,956,847 B2
(45) Date of Patent: Oct. 18, 2005

(54) MULTI-RATE, MULTI-PROTOCOL, MULTI-PORT LINE INTERFACE FOR A MULTISERVICE SWITCHING PLATFORM

(75) Inventors: Matthew L. Heston, Plano, TX (US); Gregory S. Nehib, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 35 days.

(21) Appl. No.: 10/465,308

(22) Filed: Jun. 19, 2003

(65) Prior Publication Data

US 2004/0258058 A1 Dec. 23, 2004

(51) Int. Cl.[7] .............................................. H04L 12/66
(52) U.S. Cl. ........................ 370/353; 370/419; 370/466
(58) Field of Search ................................ 370/419, 535, 370/352, 353, 359, 360, 401, 395.5, 395.51, 407, 413, 455–469; 398/50

(56) References Cited

U.S. PATENT DOCUMENTS

| | | | | |
|---|---|---|---|---|
| 5,040,170 A | * | 8/1991 | Upp et al. ..................... 398/50 |
| 6,058,119 A | * | 5/2000 | Engbersen et al. ........... 370/466 |
| 6,075,788 A | * | 6/2000 | Vogel ..................... 370/395.51 |
| 6,122,281 A | * | 9/2000 | Donovan et al. ............. 370/401 |
| 6,222,848 B1 | * | 4/2001 | Hayward et al. ............. 370/412 |
| 6,385,209 B1 | * | 5/2002 | Skirmont et al. ............. 370/419 |
| 6,389,013 B1 | | 5/2002 | Doss et al. ................... 370/364 |
| 6,430,201 B1 | * | 8/2002 | Azizoglu et al. ............. 370/535 |
| 6,567,402 B1 | | 5/2003 | Jones et al. .................. 370/360 |
| 6,590,885 B1 | | 7/2003 | Jorgensen ................... 370/338 |
| 6,608,836 B2 | * | 8/2003 | Mao et al. ................... 370/419 |
| 6,633,584 B1 | * | 10/2003 | Russell et al. ............... 370/466 |
| 6,636,529 B1 | * | 10/2003 | Goodman et al. ........... 370/469 |
| 6,654,383 B2 | * | 11/2003 | Haymes et al. ............. 370/466 |
| 6,671,271 B1 | * | 12/2003 | Takemura et al. ........... 370/352 |
| 6,704,326 B2 | * | 3/2004 | Russell et al. ............... 370/466 |
| 6,741,615 B1 | * | 5/2004 | Patwardhan et al. ........ 370/514 |
| 6,751,239 B2 | * | 6/2004 | Raman et al. ............... 370/466 |
| 6,765,916 B1 | * | 7/2004 | Duvvuru et al. .......... 370/395.5 |
| 2002/0176450 A1 | * | 11/2002 | Kong et al. .................. 370/539 |
| 2002/0191543 A1 | | 12/2002 | Buskirk et al. ........... 370/230.1 |
| 2003/0016690 A1 | | 1/2003 | Jordan ......................... 370/433 |
| 2003/0112833 A1 | * | 6/2003 | Kamiya ....................... 370/535 |
| 2003/0133712 A1 | * | 7/2003 | Arikawa et al. ............... 398/2 |
| 2003/0161352 A1 | * | 8/2003 | Miyamoto ................... 370/535 |
| 2004/0076168 A1 | * | 4/2004 | Patenaude ................... 370/406 |
| 2004/0076175 A1 | * | 4/2004 | Patenaude ................... 370/465 |

FOREIGN PATENT DOCUMENTS

EP        001100222 A2 *  5/2001

OTHER PUBLICATIONS

GR–253–CORE,Synchronous Optical Network (SONET) Transport Systems: Common Generic Criteria, Sep. 2000, Telcordia Technologies, Issue 3, section 2, 3 and 5.*

* cited by examiner

Primary Examiner—Bob Phunkulh
Assistant Examiner—Ian N. Moore
(74) Attorney, Agent, or Firm—Aka Chan LLP

(57) ABSTRACT

Methods and apparatus for enabling a line card to support multiple ports, multiple rates, and multiple protocols within an optical network system are disclosed. According to one aspect of the present invention, a line card that is suitable for incorporation into one of a multi-slot broadband digital cross-connect system or a multiservice provisioning platform includes a first port and a plurality of devices. The first port is arranged to be provisioned to accept an input signal which may be one of a signal of a first protocol and a signal of a second protocol. The plurality of devices being arranged to process the input signal to create an output signal which has a SONET payload. In one embodiment, the signal of the first protocol is an OC-n signal and the signal of the second protocol is a Gigabit Ethernet signal.

15 Claims, 7 Drawing Sheets

MULTI-RATE, MULTI-PROTOCOL, MULTI-PORT LINE INTERFACE FOR A MULTISERVICE SWITCHING PLATFORM

BACKGROUND OF THE INVENTION

1. Field of Invention

The present invention relates generally to data and telecom communication systems. More particularly, the present invention relates to systems and methods for providing a multi-port line card which is capable of enabling multiple signal or line rates of different protocols to be efficiently supported.

2. Description of the Related Art

The demand for data and telecom communication services is growing at an explosive rate. Much of the increased demand is due to the fact that as the use of computing devices becomes more prevalent, the need for creating networks of computing devices such that resources may be shared between the computing devices also increases. Computing devices often share transmission bandwidth with legacy voice and video services more common to the telecommunications industry. The implementation and operation of a network is preferably such that resources from both environments may be shared in an efficient manner. As a result, the ability to handle different line rates and protocols and the ability to increase the bandwidth of signals is becoming more important.

A Multiservice Provisioning Platform (MSSP) is an example of optical transport equipment which may be used in a metropolitan network and offers TDM and SONET services, as well as Ethernet service interfaces, in a platform that is relatively small, e.g., smaller than conventional, or legacy, SONET add-drop multiplexer and digital cross connect equipment. An MSSP generally provides an increased amount of scalability and functionality over than provided by conventional SONET equipment, while requiring less space than conventional SONET equipment, and is relatively cost effective. In addition, an MSSP enables the bandwidth handled on networks to be increased, and also combines the functions of legacy SONET ADMs and cross-connects into a single platform.

In order to support numerous high-speed metropolitan rings, an MSSP generally has a high port density. Hence, line cards used in a system which may be part of an MSSP are becoming multi-port line cards. Fixed rate multi-port line cards, or line cards with multiple ports which support signals of a fixed rate, are often used in an MSSP or on a large broadband digital cross connects (BBDXC). While effective in supporting signals of a fixed rate, the use of fixed rate multi-port line cards typically limits the ability of service providers to react to service demands at varying line rates, as the service providers may have to overbuy fixed rate multi-port line cards across all potential fixed rates. For example, if one customer has been sending OC-3 signals and now wishes to send OC-48 signals, a service provider may need to obtain a new multi-port line card to support the OC-48 signals.

The need to obtain separate fixed rate multi-port line cards to allow signals of different rates to be supported by a system leads to a lack of flexibility when the system is scaled, and also leads to an increased probability that all line card slots in the system may be filled beyond system expansion limits before a full service density is achieved. In order to increase the flexibility of a system, some multi-port line cards allow for some rate variation. Such multi-rate, multi-port line cards may support two or three different signal rates of the same protocol. Each port of such line cards may be provisionable to support different rates. By way of example, a multi-rate, multi-port line card may support both OC-3 and OC-12 signals. Although the use of multi-rate, multi-port line cards may slightly increase the bandwidth and the flexibility of a system, since only a relatively small variation in line rates is supported, the increase in flexibility is generally not significant in terms of reducing the probability that all line card slots within a system will fill beyond system expansion limits without achieving a full service density. Further, such multi-rate, multi-port line cards generally support only a single protocol.

Therefore, the functionalities needed are a method and an apparatus which allow different line rates to be efficiently supported within a system such as an MSSP or a BBDXC. That is, what is desired is a line card which allows multiple, varied rates of different protocols and optical span reaches to be supported on different ports such that a service density and flexibility associated with a system which uses the line card may be significantly increased. This next generation line card should be flexible to the extent that increasing bandwidth or migrating from SONET to Ethernet services may be provisioned through software without hardware changes including optics modules.

SUMMARY OF THE INVENTION

The present invention relates to a line card which supports multiple ports, multiple rates, and multiple protocols, and is suitable for use within an optical network system. According to one aspect of the present invention, a line card that is suitable for incorporation into one of a multi-slot broadband digital cross-connect system or a multiservice provisioning platform includes a first port and a plurality of devices. The first port is arranged to be provisioned to accept an input signal which may be one of a signal of a first protocol and a signal of a second protocol. The plurality of devices being arranged to process the input signal to create an output signal which has a SONET payload. In one embodiment, the signal of the first protocol is an OC-n signal and the signal of the second protocol is a Gigabit Ethernet signal.

When signals of varying rates and multiple protocols, e.g., OC-n and Gigabit Ethernet protocols, may be provisioned to be received on the same physical port of a line card, the flexibility of the line card may be increased, and the capabilities of an overall system which uses the line card may be readily expanded. In other words, providing the ability to deliver multiple rates which may be of multiple protocols using a single port on a line card enables the density and flexibility associated with the line card and, hence, a system which uses the line card, to be improved. As a result, the efficiency with which an overall system which uses the line card may operate may be improved.

According to another aspect of the present invention, a line card includes a first port of a plurality of ports that is configured or provisioned to receive one of an OC-3 signal, an OC-12 signal, an OC-48 signal, and a Gigabit Ethernet signal. The line card also includes a plurality of devices which receive the signal and process the signal to create an STS-48 SONET signal. A backplane of the line card receives the STS-48 SONET signal from the plurality of devices, and allows the STS-48 SONET signal to be passed out of the line card.

In one embodiment, the plurality of devices includes a multi-rate serialize-deserialize device which is arranged to accept the signal in a serialized format, a first device which includes section and line termination functionality in the creation of the STS-48 SONET signal, a second device, and a switch. The second device is arranged to map the Gigabit Ethernet signal to create a mapped signal with a SONET payload, and the switch is arranged to receive the signal serially from the multi-rate serialize-deserialize device and to provide the signal to either the first device or the second device. When the switch provides the signal to the second device, the second device returns the mapped signal to the switch which then passes the mapped signal to the first device.

According to still another aspect of the present invention, a line card which is configured to be included in a system on a network includes at least one port which receives a signal of a first format, a first module, and a second module. The first module is arranged to receive the signal of the first format serially from the port, and determines when the first format is a desired format. When it is determined that the first format is not the desired format, the first module determines when to map the signal of the first format into a signal of the desired format and maps the signal of the first format into the desired format using the first module. The second module is arranged to receive the signal of the first format serially from the first module when it is determined that the signal is not to be mapped into the signal of the second format using the first module. The second module further also receives the signal of the first format serially from the first module when it is determined that the first format is the desired format, and receives the signal of the desired format serially from the first module when the signal of the first format is mapped into the signal of the desired format using the first module. The second module also determines when to map the signal of the first format into the signal of the desired format using the second module and maps the signal of the first format into the signal of the desired format using the second module when appropriate.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

In order to increase the flexibility of a system such as a Multiservice Switching Platform (MSSP) or a large broadband digital cross connect (BBDXC), some multi-port line cards used in the system allow for some small variation in optical rates. Although the use of multi-rate, multi-port line cards may slightly increase the bandwidth and the flexibility of a system, since only a relatively small variation in line rates is supported, the increase in flexibility generally does not reduce the probability that all line card slots within a system will fill beyond system expansion limits without achieving a full service density. That is, conventional multi-rate, multi-port line cards generally do not significantly increase the flexibility and service density of a system in which the line cards are incorporated.

By utilizing existing optical transceivers in line cards, as for example existing OC-48 optical transceivers, with a modified clock and data recovery module that allows programmable bandwidth limiting, an optical line card which includes the transceiver may deliver optical signals of varying rates and protocols off of the same physical port on the line card. For example, OC-3, OC-12, OC-48, and one Gigabit Ethernet (Gig-E) services may be provided off of the same physical port on the line card, although it should be appreciated that the multiple services provided off of the same physical port may vary widely. Providing the ability to deliver multiple rates which may be of multiple protocols using a single port on a line card, which may have multiple ports, enables the density and flexibility associated with the line card and, hence, a system which uses the line card, to be improved. As a result, the efficiency with which an overall system which uses the line card may operate may be significantly improved.

Figure 1:
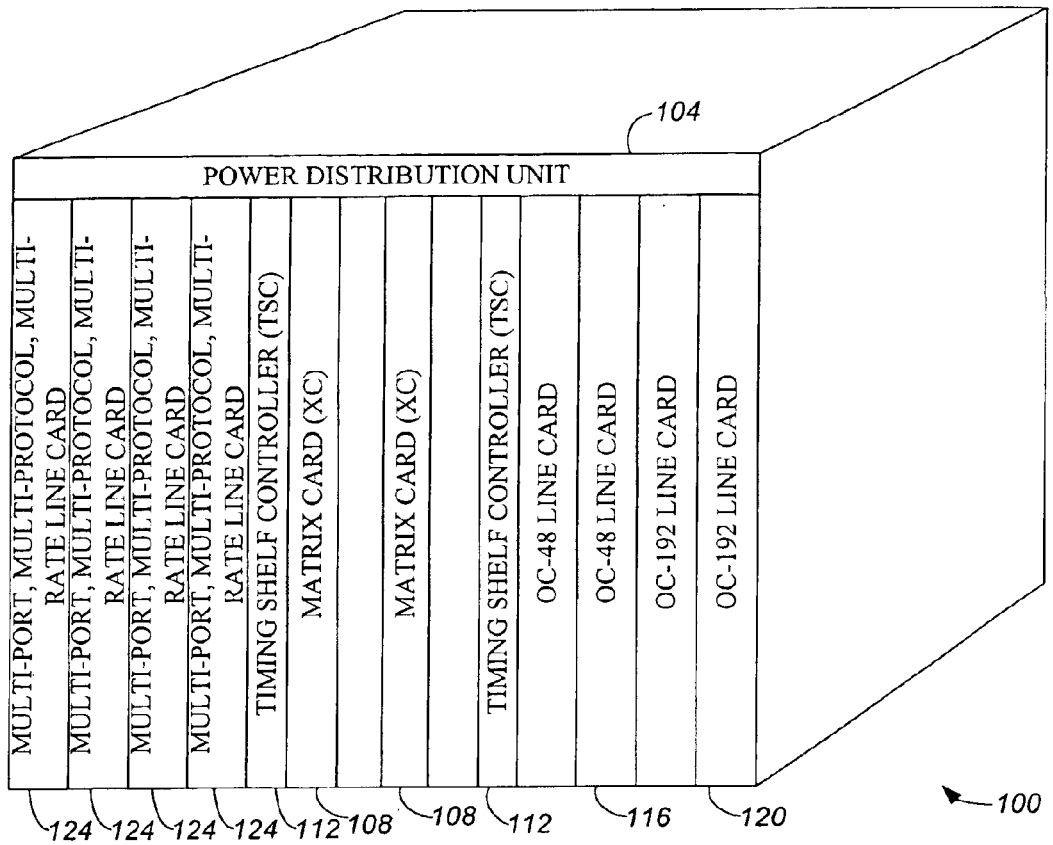
FIG. 1 is a diagrammatic representation of a system which is suitable for accepting a multi-port, multi-protocol multi-rate line card in accordance with an embodiment of the present invention.

FIG. 1 is a diagrammatic representation of a system which is suitable for accepting a multi-port, multi-protocol, multi-rate line card in accordance with an embodiment of the present invention. A system 100, which may be part of an ONS 15600 platform available from Cisco Systems of San Jose, Calif., generally includes a power distribution unit 104, matrix cards 108, and timing shelf controllers 112. System 100 may also generally be a part of an MSSP or a BBDXC. As will be appreciated by those skilled in the art, matrix cards 108 may be cross-connect cards. System 100 may also include various line cards, which are positioned in slots of system 100, such as an OC-48 line card 116, which typically has up to approximately sixteen ports, and an OC-192 line card 120, which each typically has up to approximately four ports.

As shown, system 100 also includes a number of multi-port, multi-protocol, multi-rate line cards 124. Each multi-port, multi-protocol, multi-rate line card 124 may include up to approximately sixteen or more ports, and may be arranged to receive a variety of different types of input. In one embodiment, each multi-port, multi-protocol, multi-rate line card 124 may be configured to receive substantially any combination of OC-3, OC-12, OC-48, and Gigabit Ethernet signals.

Using line card 124 within system 100 enables efficient input/output (I/O) slot utilization, as each slot which supports a line card 124 effectively supports a combination of OC-3, OC-12, OC-48, and Gigabit Ethernet signals. Hence, system 100 is effectively readily expandable, and bandwidth upgrades, e.g., from an OC-3 signal to an OC-48 signal, may be achieved substantially without requiring significant changes in equipment. Ports of line card 124 may be provisioned as appropriate to change the type of signal the ports are expected to receive.

Figure 2A:
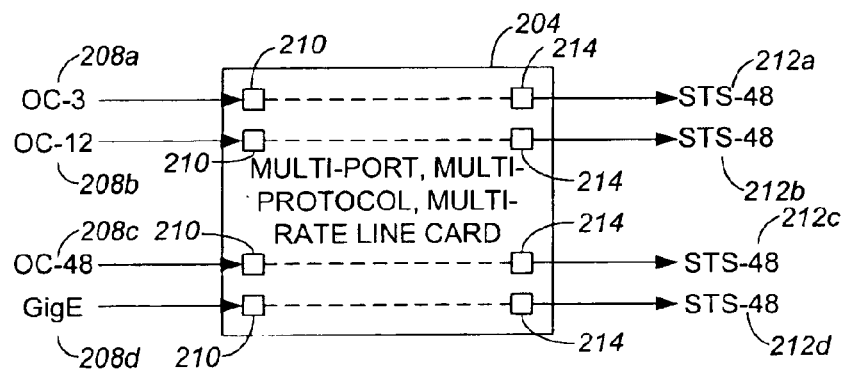
FIG. 2a is a diagrammatic representation of a multi-port, multi-protocol, multi-rate line card which converts signals of different rates and protocols into an STS-48 SONET format in accordance with an embodiment of the present invention.
Figure 3:
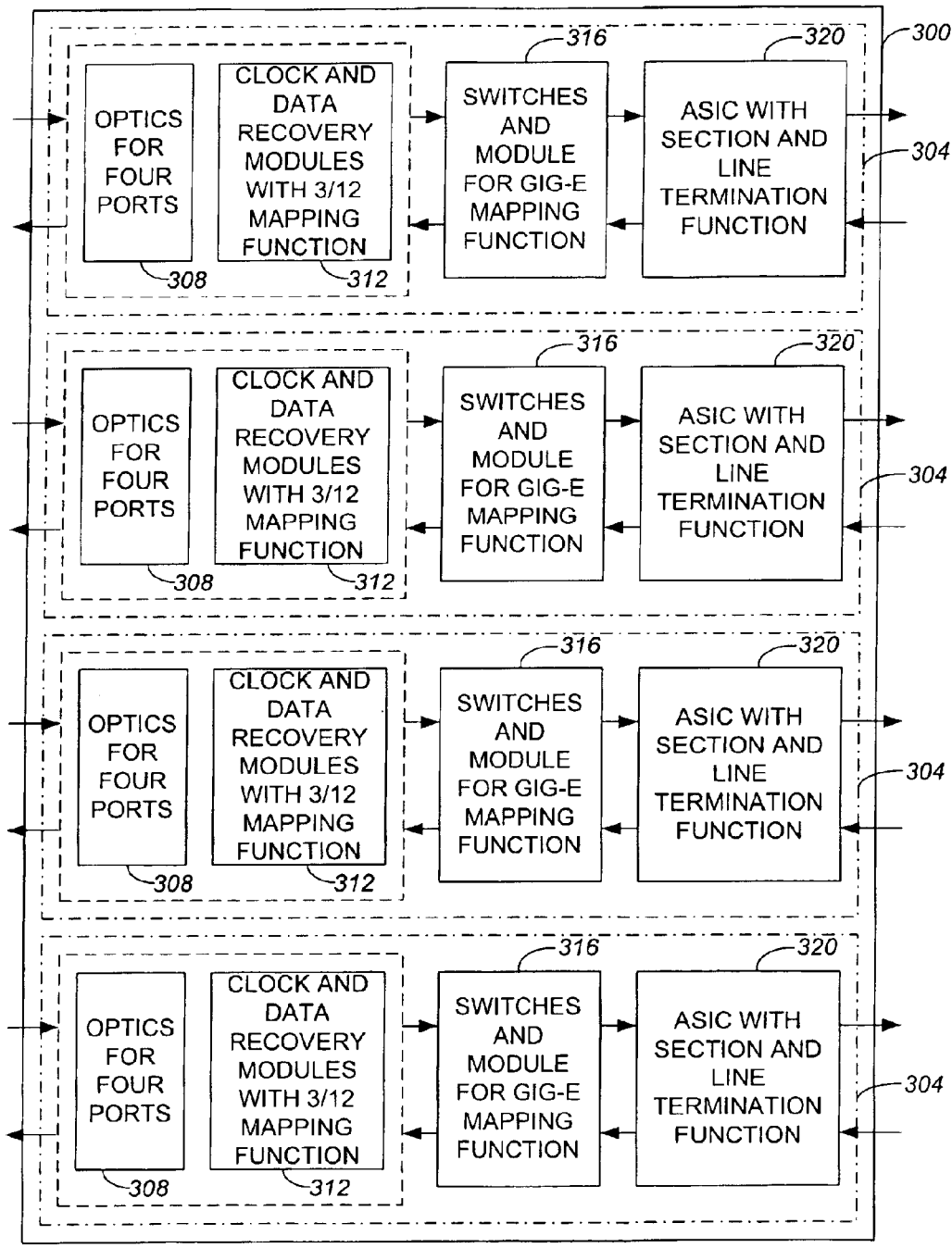
FIG. 3 is a diagrammatic block representation of a multi-rate, multi-protocol, multi-port line card in accordance with an embodiment of the present invention.

FIG. 2*a* is a diagrammatic representation of a multi-port, multi-protocol, multi-rate line card which converts signals of different rates and protocols into an STS-48 SONET format in accordance with an embodiment of the present invention. A line card 204, which will be described below in more detail with respect to FIG. 3, is arranged to receive input signals 208 on ports 210 and map or otherwise convert input signals 208 into output signals 212 which may be provided to backplane ports 214. Although line card 204 may typically be configured to include up to approximately sixteen or more ports 210, four ports 210 have been shown as being included on line card 204 for ease of illustration.

In the described embodiment, line card 204 is arranged to map input signals 208 into an output signal 212 of an STS-48 SONET format. For example, an OC-3 input signal 208*a* is mapped by line card 204 into output signal 212*a* which is of an STS-48 SONET format. Similarly, an OC-12 input signal 208*b* is mapped by line card 204 into output signal 212*b* which is of an STS-48 SONET format, and an OC-48 input signal 208*c* is effectively not mapped by line card 204, and is substantially passed through line card 204 and forms output signal 212*c* which is of an STS-48 SONET format.

In addition to being suitable for receiving OC-3, OC-12, and OC-48 signals, line card 204 is also suitable for receiving Gigabit Ethernet signals. An input signal 208*d* on port 210, as shown, is a Gigabit Ethernet signal. Input signal 208*d* may be mapped within line card 204 into an output signal 212*d* that is of an STS-48 format. Hence, each input signal 208 which may be received and mapped by line card 204, regardless of protocol, is mapped into a common type of output signal 212.

Each of ports 210 may generally be provisioned to accept a particular kind of traffic. Although each port 210 may be provisioned to accept any one of an OC-3, and OC-12, an OC-48, or a Gigabit Ethernet signal, each port 210 is typically provisioned to accept substantially only the type of traffic that is expected to be received by each port 210. Hence, since input signal 208*a* is an OC-3 signal, port 210 on which input signal 208*a* is received is typically provisioned to accept an OC-3 signal.

Figure 2B:
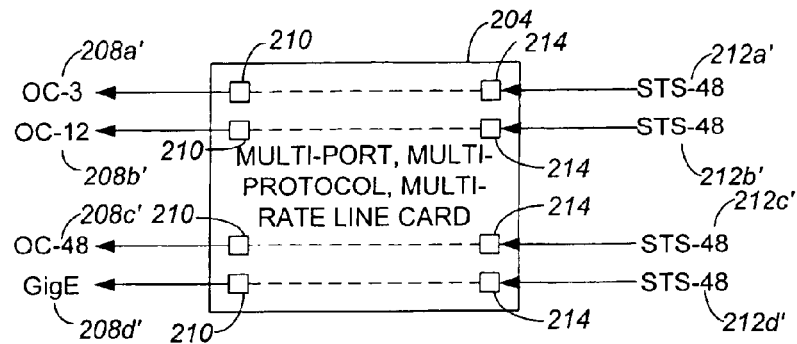
FIG. 2b is a diagrammatic representation of a multi-port, multi-protocol, multi-rate line card, e.g., line card 204 of FIG. 2a, which converts signals of an STS-48 SONET format into their original formats in accordance with an embodiment of the present invention.

Line card 204 is configured to convert received STS-48 SONET signals into an appropriate, original format, i.e., a format which was mapped into an STS-48 SONET format. FIG. 2*b* is a diagrammatic representation of a multi-port, multi-protocol, multi-rate line card, e.g., line card 204 of FIG. 2*a*, which converts signals of an STS-48 SONET format into their original formats in accordance with an embodiment of the present invention. When STS-48 SONET signals 212' are received on backplane ports 214, signals 212' may be studied by line card 204 to determine whether signals 212' were created from OC-3, OC-12, OC-48, or Gigabit Ethernet signals. Once it is determined what format signals 212' were in before being converted into STS-48 SONET signals, signals 208' may effectively be recreated from signals 212'. By way of example, signal 212*a*' may be determined by line card 204 as having originally been an OC-3 signal. As such, line card 204 maps or converts signal 212*a*' into an OC-3 signal 208*a*'

Figure 2C:
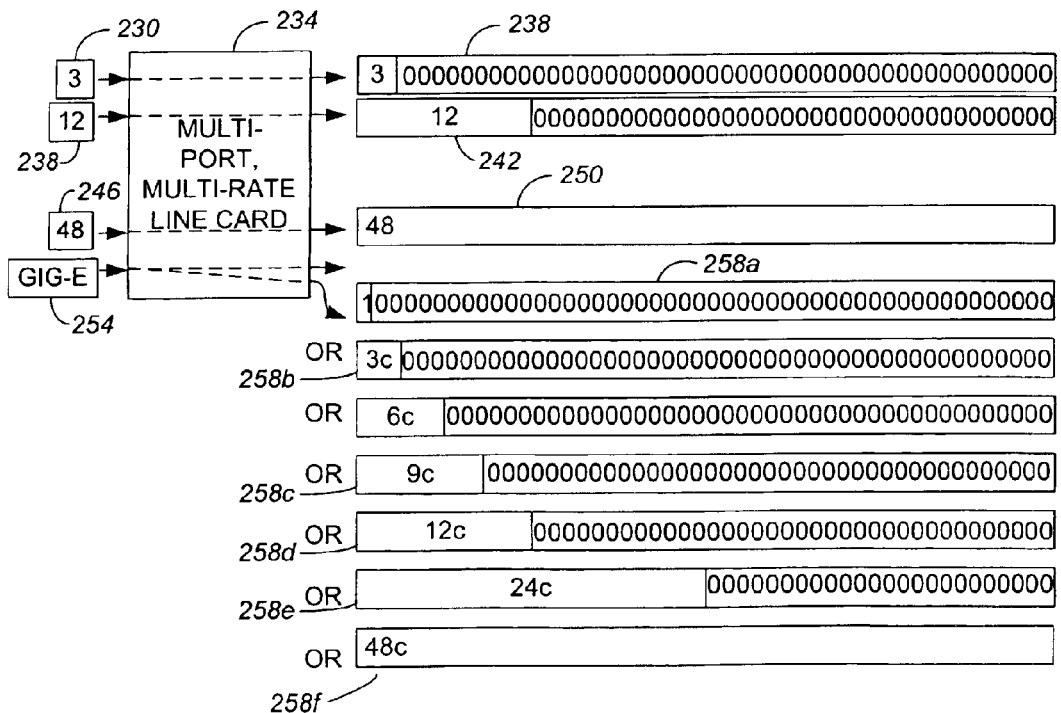
FIG. 2c is a diagrammatic representation of STS-48 SONET signals in accordance with an embodiment of the present invention.

In general, an STS-48 SONET signal that is substantially created from a different format may include idle, null, or zero entries which are used to map signals such as OC-3, OC-12, and Gigabit Ethernet signals into an STS-48 SONET format. Referring next to FIG. 2*c*, the creation of STS-48 SONET signals from signals of different rates or protocols will be described in accordance with an embodiment of the present invention. An OC-3 signal 230 which is received on a multi-port, multi-protocol, multi-rate line card 234 is mapped into an STS-48 SONET format signal 238 which includes approximately 48 STS-1 frames. While any three STS-1 channels within an STS-48 frame effectively include data from OC-3 signal 230, the remaining 45 STS-1 channels are effectively padded with idles, zeros, AIS, random data, or substantially any other valid data. For ease of discussion, the padding of remaining STS-1 channels will generally be discussed herein and after in terms of idles, although it should be appreciated that substantially any information may be used to pad the remaining STS-1 channels. The first three STS-1 channels in signal 238 are shown as including data from OC-3 signal 230 for clarity, although any three STS-1 channels may be used to hold the data from OC-3 signal 230. Similarly, an OC-12 signal 238 which is received on line card 234 is mapped into an STS-48 SONET format signal 242 in which any twelve STS-1 channels within an STS-48 frame of signal 242 include information from OC-12 signal 238, while the remaining 36 STS-1 channels of signal 242 are padded with zeros. The first twelve STS-1 channels of signal 242 are shown as including data for clarity, although any twelve STS-1 channels may generally be used to include data.

Since an OC-48 signal 246 is effectively not mapped using line card 234, OC-48 signal 246 is outputted from line card 234 as an STS-48 SONET signal 250 in which each of the STS-1 frames included in signal 250 contains data associated with OC-48 signal 246. In other words, each of the 48 STS-1 frames included in signal 250 contains data associated with OC-48 signal 246.

Generally, a Gigabit Ethernet signal 254 may be converted or mapped by line card 234 into a variety of different contiguous or virtual concatenations which may be included in an output signal 258 associated with Gigabit Ethernet signal 254. Such concatenations include, but are not limited to, an STS-1 channel, an STS-3c concatenation, an STS-6c concatenation, an STS-9c concatenation, an STS-12c concatenation, an STS-24c concatenation, an STS-48c concatenation, and various virtually concatenated SONET formats ranging from one to 48 STS1-Nv or ranging from one to sixteen STS3c-Yv. For example, when Gigabit Ethernet signal 254 is mapped into an STS-1 concatenation, an output STS-48 SONET signal 258*a* which includes STS-1 channels within an STS-48 may be created such that information contained in Gigabit Ethernet signal 254 is contained within any single STS-1 channel within an STS-48 frame in signal 258*a* while the remaining 47 STS-1 channels are filled with idle, zero, AIS, random data, or other payload. Likewise, when Gigabit Ethernet signal 254 is mapped into an STS-24c concatenation, any 24 STS-1 channels of an STS-48 frame in signal 258*e* may include information contained in Gigabit Ethernet signal 254 while the remaining 24 STS-1 channels may be filled with zeros, idle, AIS, random data, or other payload.

When an STS-48 SONET signal is received through the backplane of line card 234, line card 234 may determine which STS-1 channels of the signal contain actual information, and which STS-1 channels in an STS-48 frame of the signal contain the expected payload. As a result, a representation of the original signal that was converted into an STS-48 SONET signal may be identified. In other words, in addition to creating an STS-48 SONET signal from an original signal, line card 234 is also suitable for use in identifying the original signal given the STS-48 SONET signal that was created from the original signal. For instance, an STS-48 SONET signal may effectively be reduced to determine whether the original signal contained within the STS-48 SONET signal was an OC-3, an OC-12, or an OC-48 signal.

With reference to FIG. 3, the functionality of a multi-rate, multi-protocol, multi-port line card will be described. FIG. 3 is a diagrammatic block representation of a multi-rate, multi-protocol, multi-port line card in accordance with an embodiment of the present invention. A line card 300, which is one embodiment of line card 204 of FIG. 2a, includes four sections 304 which are each arranged to support four ports. It should be appreciated that the number of sections 304 may vary depending upon the number of ports which are supported by line card 300. The number of ports in sections 304 may also vary.

Each section 304 includes optics 308 for four ports which are in communication with clock and data recovery modules 312. Optics 308 are arranged to receive signals, e.g., signals transmitted across a network, and pass the signals serially into clock and data recovery modules 312. In one embodiment, signals received by optics 308 may include OC-3 signals, OC-12 signals, OC-48 signals, and Gigabit Ethernet signals.

Clock and data recovery modules 312 include mapping functionality which allows OC-3, OC-12, and OC-48 signals to be mapped into a common format, e.g., an OC-48 signal format. By way of example, a clock and data recovery module 312 may take an OC-3 signal from optics 308, perform a clock recovery, multiply a clock up, and provide an output OC-48 signal. This may be done by partially terminating the section overhead and mapping the section, line and payload of the incoming signal to an STS48 frame. Gigabit Ethernet signals which pass through optics 308, however, generally are not mapped within clock and data recovery module 312 and, instead, are passed substantially directly through clock and data recovery module 312. Typically, clock and data recovery module 312 allows programmable bandwidth limiting that provides the capability to deliver OC-3, OC-12, OC-48, and Gigabit Ethernet services off of the same physical ports which are coupled to optics 308.

Each clock and data recovery module 312 takes in a serial signal from optics 308, performs mapping as appropriate, and provides an output serial signal, e.g., an STS-48 signal or a Gigabit Ethernet signal, to a module 316. Module 316 includes switches and a sub-module which performs a Gigabit Ethernet mapping function on received Gigabit Ethernet signals to effectively convert Gigabit Ethernet signals into contiguous or virtual concatenations of SONET signals which may then be mapped into an STS-48 SONET signal. Switches within a module 316 allow an OC-48 signal to pass through module 316 and into an application specific integrated circuit (ASIC) 320 which may include section and line termination functionality. That is, an OC-48 signal which passes through module 316 may have section termination and line termination performed by ASIC 320 such that an STS-48 SONET signal may be passed out of ASIC 320 and, hence, line card 300, as will be described below with reference to FIGS. 4 and 5. Typically, ASIC 320 may also align frames with other STS-48 SONET signals.

As previously mentioned, module 316 includes a sub-module which performs a Gigabit Ethernet mapping function. Switches, which route signals within module 316 depending upon how circuitry associated with module 316 is provisioned, typically route Gigabit Ethernet signals such that the Gigabit Ethernet signals may be mapped, as will be discussed below with respect to FIGS. 4 and 6. Once a Gigabit Ethernet signal is mapped within module 316, the mapped signal is passed to ASIC 320 for section and line termination.

Figure 4:
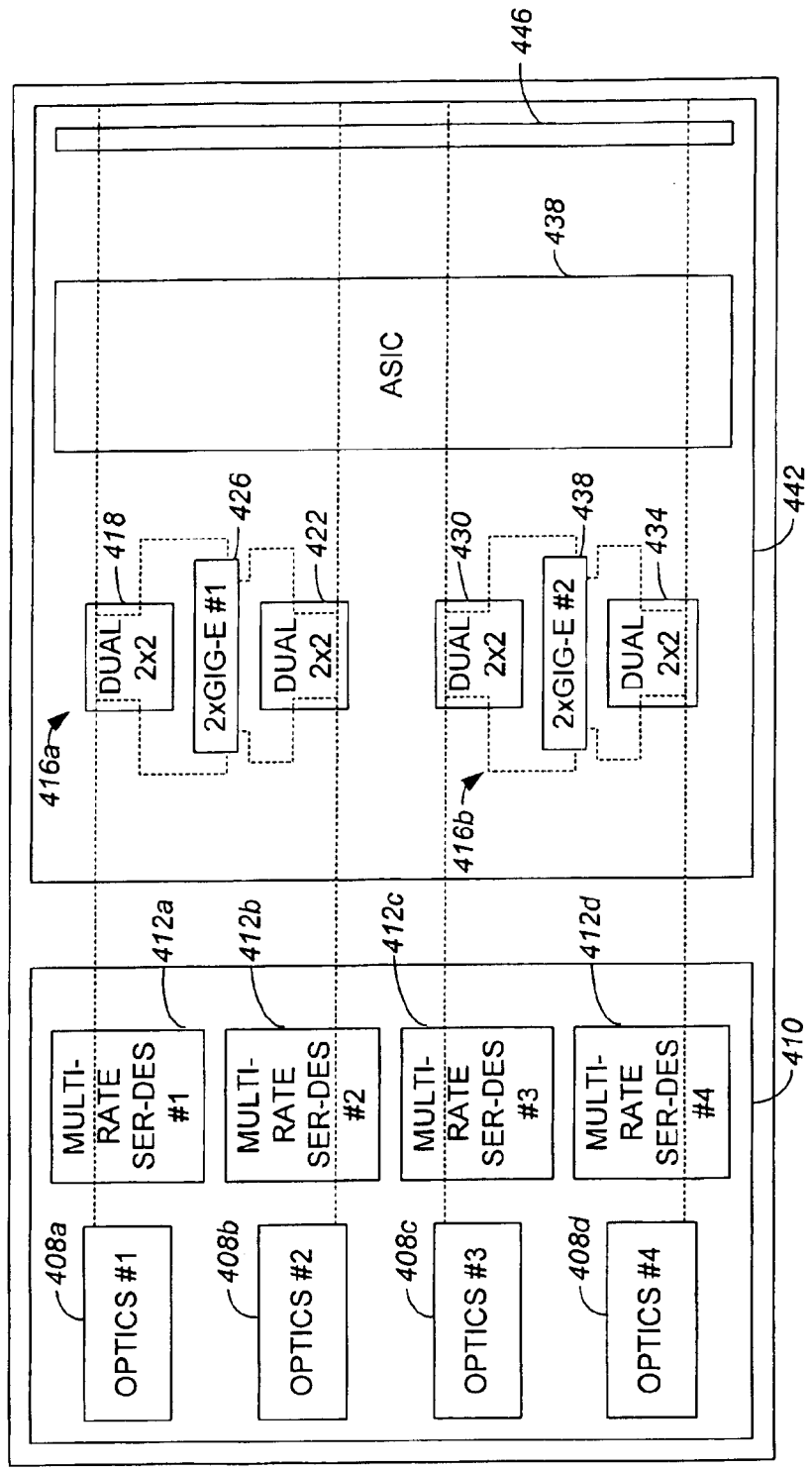
FIG. 4 is a diagrammatic representation of one section of a line card, e.g., section 304 of line card 300 of FIG. 3, in accordance with an embodiment of the present invention.

FIG. 4 is a diagrammatic representation of one section of a line card, e.g., section 304 of line card 300 of FIG. 3, in accordance with an embodiment of the present invention. A section 304' of a line card includes optics 408 for each port, e.g., each of four ports associated with section 304'. Optics 408 are in communication with clock and data recovery modules 412 with mapping functions which, in the described embodiment, include multi-rate serialize-deserialize chips which enable serialized signals to pass through modules 412, and also enables deserialized signals to be multiplexed into serialized signals. Optics 408 typically include receive and transmit functionality, and may be a module, an SFP, or a discrete implementation. In the described embodiment, when signals received through optics 408 from ports by modules 412 are either OC-3 or OC-12 signals, it should be understood that modules 412 may then perform OC-3 or OC-12 SONET framing, respectively, and B1 processing on the signals.

Once a module 412, as for example module 412a, is used to map signals as appropriate, in one embodiment, one of an STS-48 signal and a Gigabit Ethernet signal passes from module 412a to overall module 416. Overall module 416 includes a first chipset 416a which includes switches 418, 422 and a chip 426 that is suitable for use in mapping the Gigabit Ethernet signal. As shown, chipset 416a is arranged to support ports associated with optics 408a, 408b, while chipset 416b is arranged to support ports associated with optics 408c, 408d.

Switches 418, 422 may be substantially any suitable switches, as for example dual 2×2 switches which are arranged to enable a signal to either pass straight through or to route the signal through chip 426 which encapsulates and maps Gigabit Ethernet signals into a SONET payload such as an STS-48 SONET signal. For example, STS-n frames may be created for Gigabit Ethernet signals, and mapped into STS-48 frames. Once a signal effectively passes through or is processed by chipset 416a, the signal is provided to ASIC 438 for section and line termination. Section and line termination may include framing, pointer processing, and overhead processing. From ASIC 438, the signal is passed to a backplane connector 446 of section 304' which may be coupled to a matrix or a cross-connect card (not shown). It should be appreciated that although ASIC 438 is effectively shown as one component, ASIC 438 may generally be formed from any number of components, e.g., four components.

In one embodiment, optics 408 and modules 412 are arranged on a pluggable daughter card 410 which may be incorporated into section 304'. Daughter card 410, which is effectively an optical transceiver, may be coupled to chipsets 416a, 416b and ASIC 438, which are incorporated into a portion 442 of section 304', through connectors. When optics 408 and modules 412 are arranged on pluggable daughter card 410, then when substantially only signals of one fixed rate are received by section 304', daughter card 410 may be swapped out for another daughter card that may be provisioned only for the fixed rate.

Figure 5:
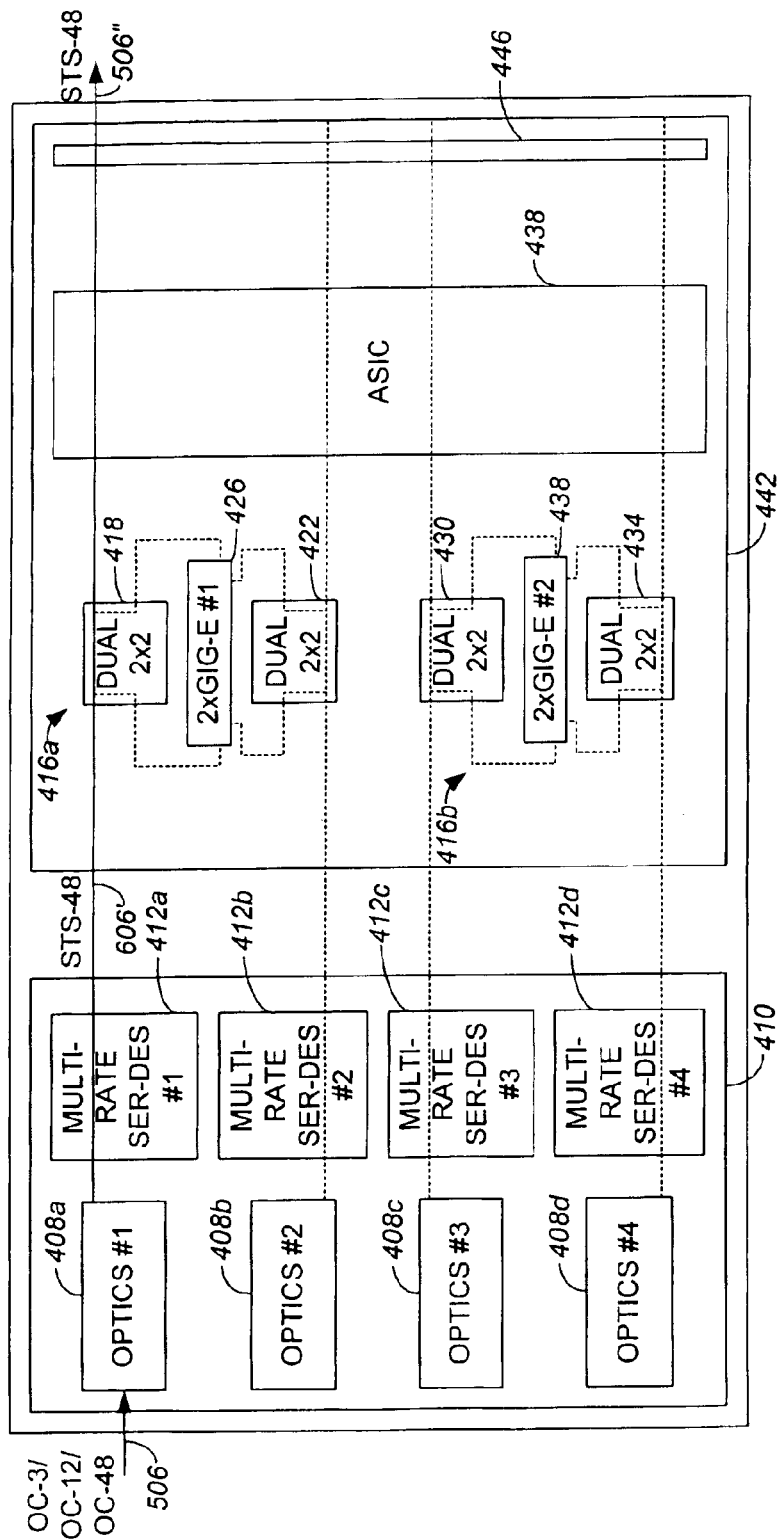
FIG. 5 is a diagrammatic representation of the path of an OC-3 signal, an OC-12 signal, or an OC-48 signal through a section of a line card, e.g., section 304' of FIG. 4, in accordance with an embodiment of the present invention.

As discussed above, when ports of section 304' are provisioned to accept signals such as an OC-3 signal or an OC-12 signal, modules 412 are arranged to map the signals into an OC-48 signal. Alternatively, when ports of section 304' are provisioned to accept an OC-48 signal, modules 412 are arranged to effectively allow the signal to pass through modules 412 without being mapped. With reference to FIG. 5, the path of an OC-3, OC-12, or an OC-48 signal through a section of a line card, e.g., section 304' of FIG. 4, will be described in accordance with an embodiment of the present invention. An input 506, which may be one of an OC-3, an OC-12, or an OC-48 signal in the described embodiment, is provided to a port (not shown) of section 304' and, hence, to optics 408a. Signal 506 is then provided to module 412a where signal 506 may be mapped or converted into a signal of a different rate. By way of example, if signal 506 is either an OC-3 signal or an OC-12 signal, then signal 506 is mapped into an STS-48 signal 506' by module 412a. However, if signal 506 is an OC-48 signal, then signal 506 is not mapped by module 412a and, instead, substantially passes through module 412a as STS-48 signal 506'.

Signal 506' is passed to chipset 416a or, more specifically, to switch 418 of chipset 416a. Since signal 506' is not a Gigabit Ethernet signal, switch 418 effectively routes signal 506' directly through chipset 416a and into ASIC 438, which performs STS-48 SONET section and line termination and provides an STS-48 SONET signal 506" to backplane 446 and out of section 446. As described above, when signal 506" is created from signal 506 which is an OC-3 signal, then any three STS channels of signal 506" include data while the remaining channels include idles or other information, as previously mentioned. Similarly, when signal 506" is created from signal 506 which is an OC-12 signal, then any twelve STS channels of signal 506" include data while the remaining frames include idles or other information. If signal 506" is created from signal 506 which is an OC-48 signal, then substantially all STS frames of signal 506" contain data which was originally in signal 506.

Figure 6:
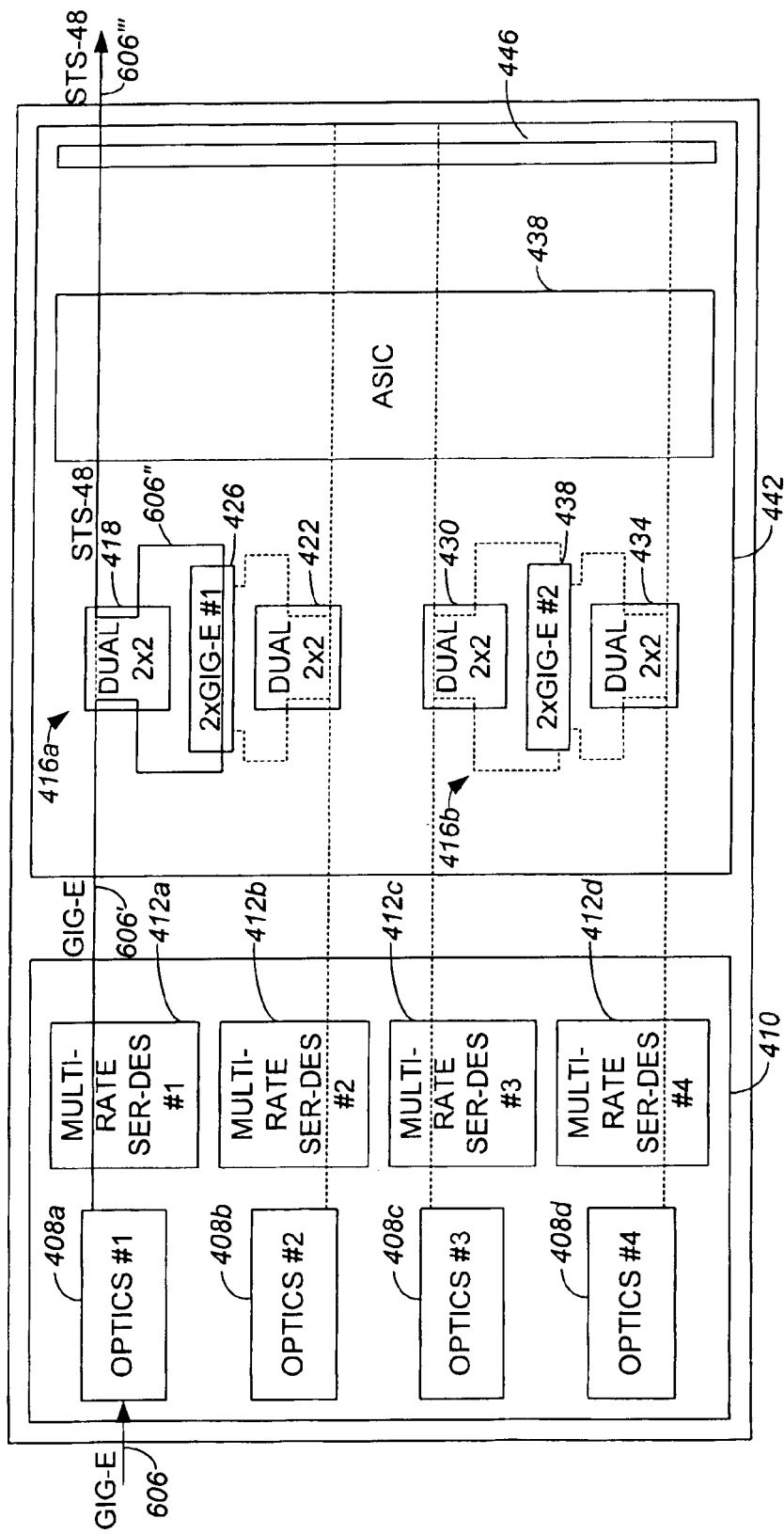
FIG. 6 is a diagrammatic representation of the path of a Gigabit Ethernet signal through a section of a line card, e.g., section 304' of FIG. 4, in accordance with an embodiment of the present invention.

In lieu of being provisioned to accept an OC-3, an OC-12, or an OC-48 signal, a port of section 304' may be provisioned to accept Gigabit Ethernet signals. When a first port of section 304' is provisioned for Gigabit Ethernet signals, the path of an input signal typically varies from the path of an input signal that is either an OC-3, and OC 12, or an OC-48 signal, with respect to overall module 416. FIG. 6 is a diagrammatic representation of the path of a Gigabit Ethernet signal through a section of a line card, e.g., section 304' of FIG. 4, in accordance with an embodiment of the present invention. When a Gigabit Ethernet signal 606 is received by a port (not shown) of section 304' that is coupled to optics 408a, signal 606 is passed from optics 408a to module 412a. Module 412a typically routes signal 606 out of module 412a substantially without mapping or converting signal 606. That is, signal 606 may effectively bypass a clock and data recovery portion of module 412a. However, it should be understood that the clock and data recovery may be used if needed. Hence, signal 606', which is the output of module 412a which corresponds to signal 606, is a Gigabit Ethernet signal.

Signal 606' is provided to chipset 416a or, more specifically, to switch 418 which effectively recognizes signal 606' as being a Gigabit Ethernet signal. In one embodiment, switch 418 chooses an appropriate data path for signal 606' based upon how chipset 416a has been provisioned. Since signal 606' is a Gigabit Ethernet signal, switch 418 routes signal 606' into chip 426 which encapsulates and maps signal 606' into a signal 606" which is a SONET STS-48 with a Gigabit Ethernet mapped payload. It should be appreciated that chip 426 may include clock and data recovery functionality which facilitates the mapping of signal 606'.

Signal 606" is passed from chip 426 back to switch 418, which then routes signal 606" to ASIC 438 which performs section and line termination on signal 606". Once section and line termination is performed on signal 606", ASIC 438 effectively outputs signal 606''', which, in the described embodiment, is an STS-48 SONET signal within which up to 48 of the STS channels contain data which corresponds to Gigabit Ethernet signal 606.

Figure 7:
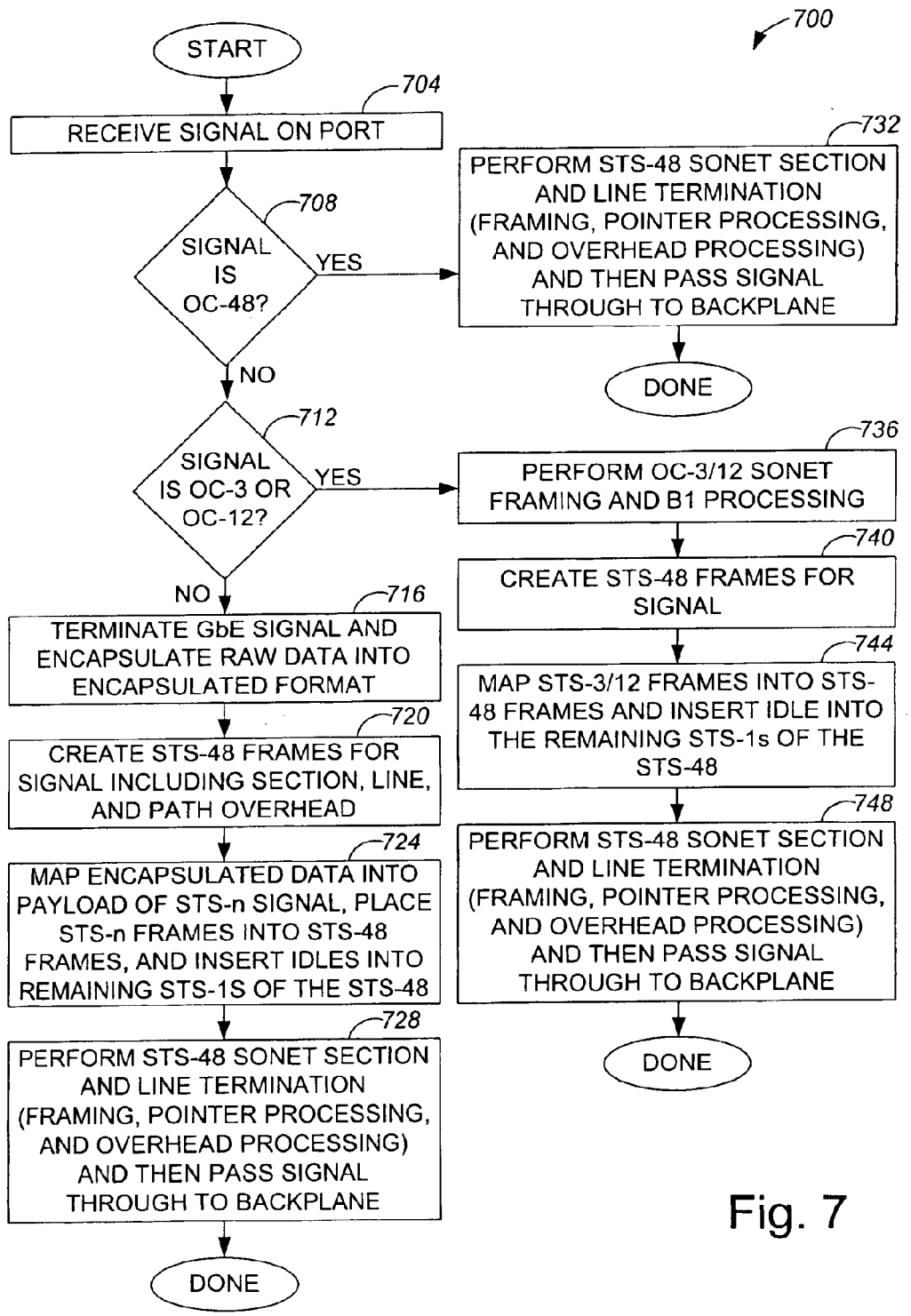
FIG. 7 is a process flow diagram which illustrates one method of processing signals using a multi-rate, multi-protocol, multi-port line card in accordance with an embodiment of the present invention.

A method of processing signals using a multi-rate, multi-protocol, multi-port line card will be described with respect to FIG. 7 in accordance with an embodiment of the present invention. A method 700 of processing signals begins at step 704 in which a signal is received on a port of a line card. Typically, the signal may be received across a link within a network that includes a system into which the line card has been integrated. Once the signal is received on the port, a determination is made in step 708 as to whether the signal is an OC-48 signal. If it is determined that the signal is an OC-48 signal, then the indication is that the signal may effectively be passed through the line card without performing a mapping process on the signal. Accordingly, process flow moves from step 708 to step 732 in which STS-48 SONET section and line termination is performed on the signal, and the signal is passed through to the backplane of the line card. As will be appreciated by those skilled in the art, performing a section and line termination typically includes framing, pointer processing, and overhead processing. After STS-48 SONET section and line termination processes are performed, the method of processing signals is completed.

Returning to step 708, when it is determined that the signal received on the port of the line card in not an OC-48 signal, then it is determined in step 712 whether the signal is an OC-3 signal or an OC-12 signal. If it is determined that the signal is neither an OC-3 signal nor an OC-12 signal, then in the described embodiment, the implication is that the signal is a Gigabit Ethernet signal. As such, in step 716, the Gigabit Ethernet signal is effectively terminated to create raw data which is encapsulated into an encapsulated format. In general, a Gigabit Ethernet signal may be mapped into an encapsulated format using substantially any suitable provisioned encapsulation formats, as for example, X.86, GFP, or Cisco HDLC available from Cisco Systems of San Jose, Calif. Once the Gigabit Ethernet signal terminated and an encapsulated format is created, STS-48 frames which include section, line, and path overhead are created for the mapped signal in step 720.

In step 724, encapsulated data is mapped into the payload of an STS-n signal, and STS-n frames are mapped into the STS-48 frames. When there are more STS-48 frames than there are STS-n frames, then idle, e.g., zeros, or other information may be inserted into the unused channels. That is, STS-1 channels associated with the STS-48 frames which have no contents associated with the STS-n frames may have idle or other information inserted therein. By way of example, when there are STS-3c frames to be mapped into STS-48 frames, then any three STS-1 channels of the STS-48 frames will typically include contents of the STS-3c frames while the remaining STS-1 frames of the STS-48 frames will typically include idle or other information.

After STS-n frames are mapped into STS-48 frames, STS-48 SONET section and line termination are performed in step 728, and the signal is passed through to the backplane of the connector. Once section and line termination, which may include framing, pointer processing, and overhead processing, is performed and the signal is passed through to the backplane, the method of processing a signal is completed.

Returning to step 712, if the determination is that the signal is either an OC-3 signal or an OC-12 signal, then STS-3 or STS-12 SONET framing is performed in step 736, as appropriate. Additionally, complete or partial section termination including framing and B1 processing may be performed. Upon completion of STS-3 or STS-12 SONET framing of the signal, STS-48 frames for the signal are created in step 740. The STS-3 or STS-12 frames are then mapped into the STS-48 frames in step 744. When the signal has been mapped into STS-3 frames, then any three STS-1 channels of the STS-48 frames will typically include contents of the STS-3 frames while the remaining STS-1 channels of the STS-48 frames will typically be padded, e.g., with idles. Similarly, when the signal has been mapped into STS-12 frames, any twelve STS-1 channels of the STS-48 frames will typically include contents of the STS-12 frames while the remaining STS-1 channels of the STS-48 frames are generally filled with, for example, idles.

Once the STS-3 or STS 12 frames are mapped into STS-48 frames appropriately, the STS-48 SONET section and line termination are performed, and the signal is passed through to the backplane of the connector in step 748. After section and line termination, which may include framing, pointer processing, and overhead processing, is performed and the signal is passed through to the backplane, the method of processing a signal is completed.

Although only a few embodiments of the present invention have been described, it should be understood that the present invention may be embodied in many other specific forms without departing from the spirit or the scope of the present invention. By way of example, while a multi-rate, multi-protocol, multi-port line card has been described as receiving OC-3, OC-12, OC-48, or Gigabit Ethernet signals and allowing the signals to be converted into an STS-48 SONET payload, such a line card may generally be arranged to receive any suitable signal. In other words, the types of signal received on a multi-rate, multi-protocol, multi-port line card may vary widely, and the capabilities of such a line card may vary. For instance, an OC-n signal such as an OC-192 signal may be received in one embodiment. When an OC-192 signal is arranged to be received, components of the line card described above may be altered or changed to accommodate the OC-192 signal. Further, in lieu of converting or mapping signals into an STS-48 SONET signal, signals may instead be mapped into a different type of SONET signal, e.g., an STS-n SONET signal or substantially any suitable signal with a SONET payload.

The number of types, e.g., rates, of signals which may be processed by a multi-rate, multi-protocol, multi-port line card may also vary widely. While signals of up to four different rates and two different protocols which may be received by up to sixteen ports have been described as being received and processed by a multi-rate, multi-protocol, multi-port line card, the number of rates may be fewer than four or more than four. Similarly, the number of protocols which are supported by a line card may also vary, as may the number of ports associated with the line card.

The various modules included in a line card may be implemented as hardware that includes firmware code devices or as software that includes software code device. By way of example, an ASIC which enables section and line termination to be performed may be programmed with firmware code devices which provide section and line termination functionality. It should be appreciated that some modules may effectively be programmed using a combination of firmware code devices and software code devices.

A multi-rate, multi-protocol, multi-port line card has generally been described as being suitable for use with respect to an MSSP or a BBDXC. It should be understood that an MSSP and a BBDXC are merely examples of systems or platforms which may benefit from the use of a line card of the present invention. Hence, a multi-rate, multi-protocol, multi-port line card may generally be used with substantially any optical system in which multiple optical rates and multiple protocols are supported.

In general, the steps associated with methods of operating a multi-rate, multi-protocol, multi-port line card may be widely varied. Steps may be added, removed, altered, or reordered without departing from the spirit or the scope of the present invention. Therefore, the present examples are to be considered as illustrative and not restrictive, and the invention is not to be limited to the details given herein, but may be modified within the scope of the appended claims.

What is claimed is:

1. A line card, the line card being arranged to be incorporated into one of a multi-slot broadband digital cross-connect system or a multiservice provisioning platform, the line card comprising:

a first port, the first port being arranged to be provisioned to accept an input signal, wherein the input signal is one of a signal of a first protocol or a signal of a second protocol; and a plurality of devices, the plurality of devices being arranged to process the input signal to create an output signal which has a SONET payload, wherein the plurality of devices are configured to process the signal of the first protocol and the signal of the second protocol and wherein the plurality of devices includes a first device which is arranged to accept the input signal in a serialized format and to process the input signal when the input signal is the signal of the first protocol, a second device which includes section and line termination functionality used in the creation of the output signal, a third device, the third device being arranged to map the input signal to create the output signal when the input signal is the signal of the second protocol, and a switch, the switch being arranged to receive the signal serially from the first device and to provide the signal to one of the second device and the third device, wherein when the switch provides the signal to the third device, the third device returns the mapped signal to the switch which then passes the mapped signal to the second device.

2. The line card of claim 1 wherein the signal of the first protocol is an OC-n signal and the signal of the second protocol is a Gigabit Ethernet signal.

3. The fine card of claim 2 wherein the OC-n signal is one of an OC-3 signal, an OC-12 signal, and an OC-48 signal.

4. The line card of claim 2 wherein the output signal is an STS-n signal.

5. The line card of claim 4 wherein the output signal is an STS-48 signal which includes approximately 48 STS-1 frames.

6. A line card, the line card being arranged to be incorporated into one of a multi-slot broadband digital cross-connect system or a multiservice provisioning platform, the line card comprising:
- a plurality of ports, the plurality of ports including a first port, the first port being arranged to receive a signal, the signal being one of an OC-3 signal, an OC-12 signal, an OC-48 signal, and a Gigabit Ethernet signal;
- a plurality of devices, the plurality of devices being arranged to receive the signal and to process the signal to create an STS-48 SONET signal, wherein the plurality of devices includes
  - a multi-rate serialize-deserialize device which is arranged to accept the signal in a serialized format,
  - a first device which includes section and line termination functionality in the creation of the STS-48 SONET signal,
  - a second device, the second device being arranged to map the Gigabit Ethernet signal to create a mapped signal with a SONET payload, and
  - a switch, the switch being arranged to receive the signal serially from the multi-rate serialize-deserialize device and to provide the signal to one of the first device and the second device, wherein when the switch provides the signal to the second device, the second device returns the mapped signal to the switch which passes the mapped signal to the first device; and
- a backplane, the backplane being arranged to receive the STS-48 SONET signal from the plurality of devices.

7. The line card of claim 6 wherein the multi-rate serialize-deserialize device is further arranged to perform a mapping on the OC-3 signal and the OC-12 signal, and to substantially allow the OC-48 signal and the Gigabit Ethernet signal to pass through.

8. A line card, the line card being arranged to be included in a system on a network, the line card comprising:
- at least one port arranged to receive a signal of a first format;
- a first module, the first module being arranged to receive the signal of the first format serially from the port, the first module further being arranged to determine when the first format is a desired format,
  - wherein when it is determined that the first format is not the desired format, the first module is still further arranged to determine when to map the signal of the first format into a signal of the desired format using the first module when it is determined that the signal of the first format is to be mapped into the signal of the desired format using the first module; and
- a second module, the second module being arranged to receive the signal of the first format serially from the first module when it is determined that the signal is not to be mapped into the signal of the second format using the first module, the second module further being arranged to receive the signal of the first format serially from the first module when it is determined that the first format is the desired format, the second module further being arranged to receive the signal of the desired format serially from the first module when the signal of the first format is mapped into the signal of the desired format using the first module,
  - wherein the second module is still further arranged to determine when to map the signal of the first format into the signal of the desired format using the second module when it is determined that the signal of the first format is to be mapped into the signal of the desired format using the second module.

9. The line card of claim 8 further including:
- a third module, the third module being arranged to receive the signal of the desired format from the second module, the third module further being arranged to perform section and line termination on the signal of the desired format and to pass a resultant signal out of the line card.

10. The line card of claim 9 wherein the first format is one of an OC-3 format, an OC-12 format, an OC-48 format, and a Gigabit Ethernet format, the desired format is the OC-48 format, and the resultant signal is an STS-48 SONET signal.

11. The line card of claim 8 wherein the first module includes clock and data recovery functionality.

12. The line card of claim 10 wherein the first format is an OC-3 format and the desired format is an OC-48 format, and wherein the first module is arranged to map the signal of the OC-3 format into the signal of the OC-48 format.

13. The line card of claim 10 wherein the first format is an OC-12 format and the desired format is an OC-48 format, and wherein the first module is arranged to map the signal of the OC-12 format into the signal of the OC-48 format.

14. The line card of claim 8 wherein the first format is a Gigabit Ethernet format and the desired format is an OC-48 format, and wherein the second module is arranged to map the signal of the Gigabit Ethernet format into the signal of the OC-48 format.

15. The line card or claim 8 wherein the first format is one of an OC-3 format, an OC-12 format, an OC-48 format, and a Gigabit Ethernet format.

* * * * *